2,992,384
FREQUENCY COUNTER
John P. Malbrain, Gardena, Calif., assignor to Thompson Ramo Wooldridge Inc., Los Angeles, Calif., a corporation of Ohio
Filed July 6, 1959, Ser. No. 825,119
12 Claims. (Cl. 324—78)

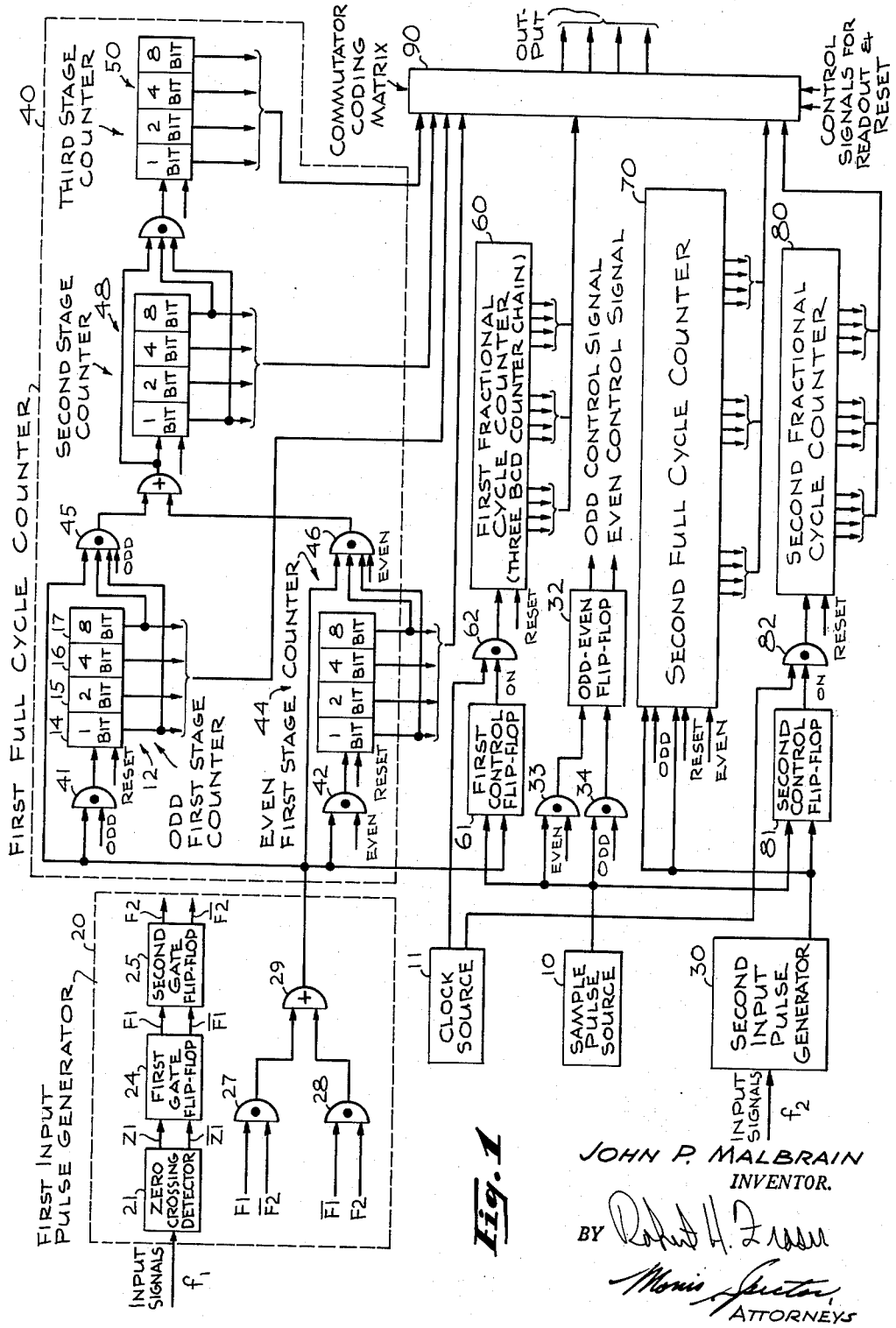

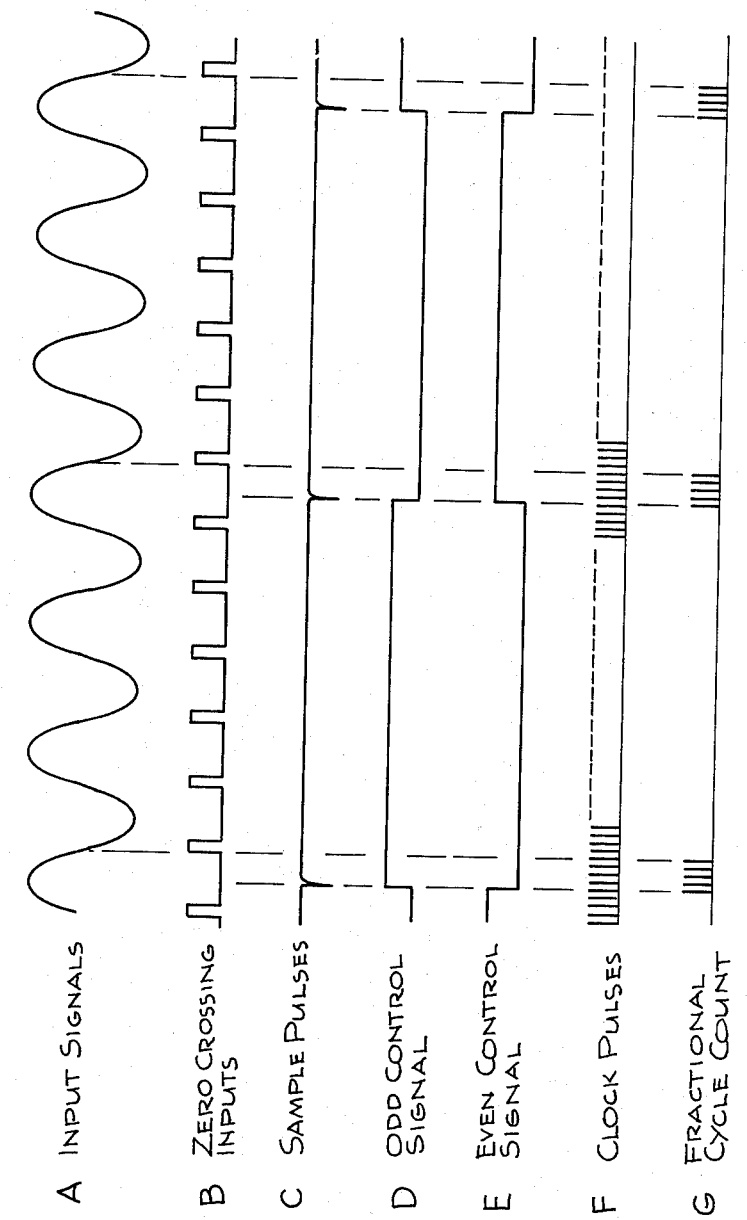

This invention relates to systems for determining frequency by counting techniques, and more particularly to a new and improved arrangement for continuously monitoring the frequency of sources which may provide signals varying over a wide range of frequencies.

The most precise and versatile systems for measuring frequency by electronic means usually utilize counting techniques. Known systems ordinarily may count periodic signals from a source for a known interval, or count pulses of known periodicity for an interval controlled by an integral part of the cycle of a signal to be measured. Either method provides a determination of the relationship of the source to a known time interval from which the repetition rate can be established.

Systems heretofore available have not, however, been satisfactorily precise over a wide range of frequencies. Thus, systems which count pulses from a source for a known time interval are most accurate in measuring high frequencies. The fewer the number of pulses in a given sample, the greater is the error introduced by the fractions of cycles which occur at each end of the sample. Increasing the duration of the sample time is not desirable and in many instances is not feasible.

Conversely, systems which count signals from a fixed frequency source are most accurate when the frequency under observation is low. As a consequence, the sampling period counts many pulses and the terminal fractional parts of cycles do not introduce much error. As the frequency being measured approaches that of the fixed source the inaccuracies correspondingly increase.

It is highly desirable to provide frequency measuring systems which are highly accurate over a wide range of frequencies. Such systems make possible the automatic monitoring of an entire frequency band without the use of special equipment or a need for adjustment with changing frequency. It is also desirable to have systems which may monitor frequencies continuously as well as automatically. By taking a great many samples over a period of time the frequency may be measured with utmost precision. Furthermore, the measurements can be arranged to provide a permanent record suitable for further investigation of the characteristics of the frequency source or a propagating medium through which the signals are passed.

A specific example of the use of frequency measuring techniques is found in systems which represent data by the relationship of two frequencies. In many situations, the frequency of a signal is the most accurate way to transmit precise information. By using two closely related frequencies a number of variables may be utilized to provide high information content in the transmitted signals. Thus, the instantaneous value of the signals may represent one variable, the instantaneous difference of the two frequencies may represent another variable, and the average frequency over a period of time may provide still further data. Inasmuch as such systems are used for their high precision potential, it is of vital importance that the associated frequency measuring equipment be compatibly accurate and precise.

It will be evident, for example, that to derive the full amount of data available from the two frequencies the readings must be both rapid and successive. Furthermore, in order to establish exact averages, insofar as possible, no counts should be lost as the measurements are made.

It is therefore an object of the present invention to provide an improved system, using counting techniques, for measuring frequencies.

It is a further object of this invention to provide an improved system for providing a substantially continuous series of readings of the frequency of two sources.

It is another object of this invention to provide an improved frequency measuring system capable of operating precisely over a wide range of input frequencies.

It is a further object of this invention to provide a frequency counter arrangement capable of continuously monitoring an input source.

It is still another object of the present invention to provide an improved system for accurately measuring the frequency of a source, the system operating with high accuracy independently of the level of frequency being measured and providing a continuous sequence of successive samples.

These and other objects of the present invention are achieved by an arrangement in accordance with the invention which operates with a variable time base which includes both a fixed-duration sampling period and an immediately following variable sampling period controlled by the cyclic relation of an input frequency to the fixed sampling period.

In a specific arrangement provided in accordance with the invention, the zero crossings of the signal of a frequency to be measured are used to provide a count of pulses during the fixed sampling time and to establish the length of the variable sampling period. Two counters are employed, one of which is arranged to count the full cycles during the fixed sampling time and the other of which is arranged to count pulses from a fixed frequency source from the end of a fixed sampling time to the occurrence of the next zero crossing. The latter counter thus ascertains fractional cycles by establishing the phase relation between the sampling period and the cycles of the frequency to be measured. Because both full and fractional cycles are precisely determined relative to known time periods, high as well as low frequencies may be measured accurately by this means.

An additional feature of the invention is the provision of systems for continuously monitoring the frequencies of two sources. A counter channel may be employed for each frequency. In each channel, two counter chains, one a full cycle and the other a fractional cycle counter as described above, are arranged in parallel. The first stage of the full cycle counter chain is arranged to have parallel counter units, which are controlled so as to be operated alternately with successive sampling pulses. Thus the count from the full cycle counter may be read out of the system as the initial counts occurring during the next sampling pulse are read into the opposite first stage counter. Further, the fractional cycle counts from successive samples may be used in the precise determination of frequency for a given sample. The outputs may be read out in a form suitable for further data processing but without requiring a delay for resetting prior to the next sampling period.

A better understanding of the present invention may be had from a reading of the following detailed description and an inspection of the drawing, in which:

FIG. 1 is a block diagram of a frequency measuring system in accordance with the invention; and FIG. 2 is a diagrammatic representation of a number of waveforms occurring within the system of FIG. 1 under various conditions of operation, which waveforms are useful in describing the operation of the system.

In FIG. 1, there are five primary sources of input signals to an arrangement in accordance with the invention. The sources of periodic or cyclic signals whose frequencies are to be determined may be associated units in the same system or may be an associated or distant transmitters. Here two input signals, of unknown frequencies $f1$ and $f2$, are applied to the system. These input signals are assumed to be of generally sinusoidal form (see waveform A of FIG. 2), but it will be understood that other waveforms may be employed, including rectangularly shaped pulses, as long as the signal is of a periodic nature. The remaining signal sources for an arrangement in accordance with the present invention are derived from the associated system and may take a number of forms. The system is described as it may be arranged for two input signals which are to be measured in frequency, rapidly and in a continuous sequence.

The signal sources include a sample pulse source 10 for generating a successive sequence of pulses having a minimum time separation between them. As may be seen in waveform C in FIG. 2, these sample pulses are of a fixed duration which is relatively long compared to the spacing between them, as this spacing may be of the order of a microsecond or less. Signals are also provided to the arrangement from a source of fixed frequency signals, such as a clock source 11. The clock pulse generator has been designated as the source 11, because many data processing machines already provide such a source and the present arrangement may conveniently utilize the clock signal for performing a timing function within the system. For purposes of illustration, the repetition rate of the clock source 11 will be assumed to be 100 kilocycles, so that one clock pulse occurs every ten microseconds. This frequency is preferably selected to be considerably higher than the range within which the input signal is expected to occur.

A number of other signals are also provided, these being the control signals which establish readout from the counters in the present arrangement and which reset the counters. The functions which are performed by these signals follow a relatively simple pattern and may be generated in a fixed sequence, or provided by associated date processing machinery in accordance with a program. Accordingly, further description of the manner in which the signals are generated has been emitted for simplicity. Following the termination of a sample pulse period, the control signals sequentially read out the counts stored in the counters in the channels of the system, and then reset these counters for the next succeeding operation.

A number of operative units which form the basic components in digital computing and data processing equipment may be alluded to at the outset in a summary fashion. These units include flip-flops, "AND" gates, "OR" gates and counter chains consisting of binary coded decimal counters. In the drawings, the "AND" and "OR" gates are designated by conventional coincidence (.) and anti-coincidence (+) notations. An "AND" gate may have more than one input, and is here said to be "primed" when all of the inputs but one have signals applied to them. The term "flip-flop" is used in conventional fashion to designate a bistable element such as bistable multivibrator.

A brief description may also be provided of binary coded decimal counters, in view of the fact that a number are used throughout the present arrangement. Reference may accordingly be made to the counter designated as the odd first stage counter 12 in the first full cycle counter 40 within the dotted lines in FIG. 1. As in the case of the remaining counters within the system, the odd first stage counter 12 is a binary counter containing internal logic which enables the counter to count in binary fashion to a decimal 10, at which point it is reset to zero. The odd first stage counter 12 consists of a chain or cascade of four connected individual bistable elements 14 through 17, each of which has a binary-valued designation. Thus the first element 14 is designated as the "one bit" and the last element 17 is designated as the "eight bit." Inputs are provided to the first element 14, so that the counter 12 counts in binary fashion until reaching a binary 9, which is expressed as 1001 where the state of each of the bi-stable elements 14—17 is represented in conventional fashion as a zero or a one. On the application of the next input pulse, the counter 12 is set again to zero, i.e., 0000 to start the next count. Each of the elements 14 through 17 in the counter 12 may be reset by application of a reset pulse, which is shown as being applied to a single input to the counter 12 even though all the elements 14 through 17 are reset thereby. Each of the counters hereinafter referred to in the present arrangement are assumed to be of this binary coded decimal form, which has particular advantages in providing suitable information for direct use in associated data processing equipment, as is described in more detail below. Other forms of decimal counters may, of course, be utilized, operating on a purely binary or other numeric base.

The arrangement of the counter stages provides successive decades of values. Each of the counters controls gating circuitry associated with the next stage counter, so that the tenth signal to a counter not only resets the counter but also is automatically directed to the next succeeding counter. In this manner there are provided successive decimal digits, each of which is in binary coded form.

An appreciation of the arrangement of the system as a whole may be gained by reference to the block diagram of FIG. 1. The system may be divided generally into two halves, each of which includes an input pulse generator, a full cycle counter and a fractional cycle counter. Inasmuch as the halves are substantially alike, only one of the input pulse generators and one of the channels (consisting of the full cycle and fractional cycle counters) need be described in detail, except that the associated control circuitry will be described to the extent necessary.

The first input pulse generator 20 is responsive to the input signals and operates to provide a timed, shaped signal upon the occurrence in the cyclic input signal of a given signal characteristic, specifically the points of zero crossing of the alternating input signal. The function of providing an indication of the occurrence of a zero crossing is performed by a zero crossing detector circuit 21, a number of forms for which are well known in digital circuitry techniques. Thus, the zero crossing detector 21 may consist of a high gain amplifier and a clipper circuit for converting the sinusoidal waveforms to rectangular waveforms. The positive and negative half cycles to these rectangular waveforms may separately prime coincidence gates (not shown) within the zero crossing detector 21. Thus clock pulses may be provided as outputs Z1 and $\overline{Z1}$ from the zero crossing detector 21, the Z1 pulses being provided during the positive half of the input cycle and the $\overline{Z1}$ pulses being provided during the negative half of the input cycle. The outputs from the zero crossing detector 21 may then be further converted into signals which perform a precise timing function within the system. Thus, the Z1 and $\overline{Z1}$ signals are applied to a pair of gate flip-flops 24, 25 which are serially coupled together as a shift register. The outputs of the gate flip-flops 24, 25 are a gating circuit which provides the desired timed output. As the Z1 signals are provided the gate flip-flops 24, 25 are set into the F1, F2 conditions. Then during the $\overline{Z1}$ series of signals the gate flip-flops 24, 25 return by successive steps to the $\overline{F1}$, $\overline{F2}$ condition. The gating circuit provides a simple timed pulse of controlled width at the start of each period and consists of a pair of "AND" gates 27 and 28 and an "OR" gate 29 which are coupled to the outputs of the shift register flip-flops 24, 25 in a fashion to satisfy the following logical equation:

$$\text{GATE } 29 = F1 \cdot \overline{F2} + \overline{F1} \cdot F2$$

This action may be summarized by saying that for each crossing of the zero level by the input signal, the first input pulse generator 20 provides a pulse of 10 microseconds duration which begins and ends with a clock pulse. This is the zero crossing input for the system and establishes fixed references by which the phase of the alternating input signal may be determined.

The second input pulse generator 30 corresponds both in arrangement and in function to the first input generator 20 and therefore is not further described. It will be recognized, however, that zero crossings may be indicated in other ways if precise and controlled timing is not a significant consideration.

Before describing the arrangement of the first full cycle counter in detail, we may consider the arrangement of certain control circuitry for that counter. This control circuitry includes an odd-even flip-flop 32 which provides what may be termed an odd control signal on one output and an even control signal on its other output. These outputs are cross-coupled back to the inputs of the odd-even flip-flop 32 through a pair of "AND" gates 33, 34, each of which is also coupled to the output of the sample pulse source 10. The arrangement establishes that each succeeding sample pulse from the sample pulse source 10 causes the flip-flop 32 to change to its opposite state, thus providing alternating odd and even control signals with alternating successive sample pulses. These control signals are applied to the inputs of various gating circuits within the system, and such inputs have been designated simply as "odd" or "even." Thus in the first full cycle counter 40 in the first counter channel of the system, the inputs to the odd first stage counter 12 are controlled by an "AND" gate 41 which is responsive to the zero crossing inputs and the "odd" signal, while inputs to an even first stage counter 44 are controlled by a "AND" gate 42 responsive to zero crossing inputs and an "even" signal. The odd first stage counter 12 and the even first stage counter 44 thus provide parallel units for the first stage of the first full cycle counter 40, these units 12 and 44 being operated alternately under control of the odd and even signals.

Outputs from the first stage counters 12 and 44 are coupled in like fashion to the input of a second stage counter 48 through gating circuitry consisting of a pair of parallel "AND" gates 45 and 46, the outputs of both of which are coupled to an "OR" gate 47. Each of the "AND" gates 45, 46 provides a signal through the "OR" gate 47 when the associated first stage counter 12 or 44 has reached the count of binary 9 and a zero crossing input is then provided. "OR" gate 47 is thus the gating circuit which controls passage of the decimal 10 signal from the first stage counter 12 or 44 to the second stage counter 48. Similarly, the binary count from the second stage counter 48 is applied to an "AND" gate 49 which directs the next succeeding input to the third stage counter 50 when both the first and second stage counters are in the decimal 9 condition.

The first fractional cycle counter 60 in the first channel counter consists of a chain of three binary coded decimal (BCD) counters which are similarly arranged to the counters in the first full cycle counter 40. Therefore this counter chain has conveniently been shown only in general form. To simplify the drawing also, the parallel binary outputs from each of the stages in the first fractional cycle counter 40 are indicated only in general by a dotted line.

Inputs to the first fractional cycle counter 60 are controlled through a first control flip-flop 61 which has one input responsive to the sample pulse source 10 and its other input responsive to the zero crossing inputs. Accordingly, the first control flip-flop 61 may be said to be turned on by sample pulses and off by the zero crossing inputs. The "on" signals from the first control flip-flop 61 prime an "AND" gate 62 which is also coupled to the clock source 11. The outputs of the "AND" gate 62 are applied to the first fractional cycle counter, these outputs representing the pulses from the clock source 11 during the interval between the termination of a sample pulse from the sample pulse source 10 and the occurrence of the next succeeding zero crossing input signal. As above, the first fractional cycle counter 60 is indicated as having a single reset, even though a reset signal controls all of the binary coded decimal counters which are included therein.

In the second counter channel, the like principal operating units are included, in the same arrangement. Thus the second full cycle counter 70 contains three stages of binary coded decimal counters, with the first stage having a pair of counters in parallel. The second full cycle counter 70 operates with input pulses from the second input pulse generator 30, with odd and even control signals from the odd-even flip-flop 32, and with reset signals from the associated system. The second fractional cycle counter 80 also includes a three binary coded decimal counter chain. Inputs to the counter 80 are controlled by a second control flip-flop 81 and an "AND" gate 82 for providing operation of the second fractional cycle counter 80 during the interval commencing with the termination of a sample pulse and the provision of the next succeeding zero crossing input from the second input pulse generator 30. The parallel outputs from the second full cycle counter 70 and the second fractional cycle counter 80 are, for ease of representation, grouped together and denoted by dotted lines.

The present arrangement makes possible the use of a commutated or serial readout of the various counter stages in each of the counter channels. A commutator coding matrix 90, which operates in a sequence determined by the control signals provided from the associated system, can derive serial binary coded signals in a form suitable for recording on magnetic tape without delaying or affecting the continuous monitoring of information.

A commutator arrangement has been indicated for the coding matrix 90 to indicate a particularly convenient way to read out the counts recorded in the system. If a commutator is provided by a coding matrix such as the matrix 90, for example, a group of logical gating elements may be arranged in a parallel relationship between the individual counters and the system outputs. These gating units may be activated in a regular sequence to pass the counts contained in the individual counters to the output, with each of the counters then being reset upon having been read, or all being reset together upon completion of the readout cycle, as desired. The commutating function may also be provided by other forms of scanning or multiplexing arrangements. If desired, however, the commutation action need not be used. A buffer storage system coupled to the counter outputs could be read in any way desired. Similarly, a number of recorders, one for each counter, could be employed.

The operation of the present system, and its configuration, are described as they may be employed in performing a continuous monitoring function on two input frequencies $f_1$ and $f_2$. The system is intended to provide information suitable for recording in a digital system, whether in a magnetic tape storage unit or for immediate use in data processing machinery. It may be assumed that the data processing machinery requires only the number of full cycles and the number of fractional cycles during a sampling period. From this information, the data processing machinery can determine the frequency, inasmuch as the duration of the fixed sampling period and the frequency of the fixed frequency source are known.

The overall sequence in which this arrangement is operated involves continuous use of the two counter channels, with alternation of the first stage counters with successive sample pulses. During each sample pulse, the full cycles are counted by counting the zero crossing signals. On termination of a sample pulse and until the occurrence of the next succeeding zero crossing signal, the fractional cycle counter for the same counter channel is operated even though the full cycle counter is then beginning to count the zero crossing channels for the next succeeding sample period. The timing of the zero crossing input signals may be appreciated by refrerence to the waveforms of FIG. 2, specifically by comparison of waveform A which shows the input signals and waveform B which shows the resultant zero crossing inputs.

The input signals for the system also include the signals from the clock source 11 and the sample pulse source 10, the sample pulse being indicated at waveform C in FIG. 2. Note that there is no fixed relationship between the leading and trailing edges of the sample pulses and the periodicity of the input signals. Note also that the interval between sample pulses is very brief, relative to the pulse width of the remaining signals used in the system.

Reference may now be made to both FIGS. 1 and 2 for an appreciation of the manner in which the system continuously monitors the frequency of the two input signals. Assuming the odd-even flip-flop 32 to have previously provided an odd control signal (waveform D in FIG. 2), the occurrence of the next sample pulse from the source 10 switches this flip-flop 32 so that it provides the even control signal (waveform E in FIG. 2). Thus, the system is primed to count with the even first stage counters, such as the counter 44 in the first channel.

Concurrently, the system is also set to count in order to find the fractional part of a cycle in the input signal which follows the termination of a sample period. If a sample pulse terminates coincidently with a zero crossing input, of course, the signals are in phase and no fractional cycle count is made. Usually, however, a fractional part of a cycle will occur at both he start and the end of a sample period. The fractional cycle counters 60 and 80 perform these counts at the beginning of each sample period. Because the fractional cycle count at the start of a sample period also determines the fractional cycle count for the end of the preceding sample period, each fractional count is used twice by the data processing machinery. In operating the fractional cycle counters 60 and 80, the beginning of each sample pulse (waveform C in FIG. 2) operates first and second control flip-flops 61, 81 to prime the "AND" gates 62 and 82 which control the inputs to the first and second fractional cycle counters 60 and 80. Pulses from the clock source 11 (waveform F in FIG. 2) are thus directed into the fractional cycle counters 60 and 80 until the application of the next succeeding zero crossing input. Such inputs, which do not coincide for the two input frequencies $f_1$ and $f_2$, turn "off" the first and second control flip-flops 61 and 81 to disable the "AND" gates 62 and 82. Thus the fractional cycle counts of the clock pulses (see waveform G in FIG. 2) begin with a sample period and terminate with the next following zero crossing input.

The first zero crossing inputs in a sample period are counted in the respective full cycle counters 40 and 70, as are the remaining zero crossing inputs in the sample period. The full cycle count proceeds to completion during the sample period, and the count is then begun for the next sample period. Because these counts are begun, in this example, with the even first stage counters in the full cycle counters 40 and 70, an interval is provided for read out of the counts stored in the various stages. During this interval the commutator coding matrix 90 may provide the recorded counts in serial form, and the control signals may reset the various stages. Read out of the fractional cycle counters 60 and 80 is accomplished in the interval between the first zero crossing input in a sample period and the end of the sample period.

As successive sample pulses are provided, therefore, the arrangement continues to operate in this manner, alternating between the odd and even first stages in the full cycle counters 40 and 70, while the fractional cycle counters 60 and 80 operate concurrently at the beginning of each sample period. Thus, the fractional cycle counters 60 and 80 overlap the full cycle counters 40 and 70 in operation to define a variable but known sampling period which can be added to or subtracted from the fixed sample period established by the sample pulse source 10.

These timing relationships illustrate the capability of the system for continuously monitoring two input frequencies occurring anywhere within a wide range. Successions of counts are made available by the counter channels. Each of the counts is provided directly in the desired binary coded decimal form, and for a sufficiently long interval to permit readout. No pulses are lost, so that each sample represents a direct continuation of the previous example. Note again that the fractional cycle count from one channel is used to establish both the starting fractional cycle time for a sample period, as well as the ending fractional cycle time for a preceding sample period.

Whether the frequency being counted is relatively high or low, this arrangement permits measurement of the frequency with substantially the same accuracy. The integral parts of the periodic input signals which are counted are the half cycles. Accordingly, the most error which could be introduced, if no fractional cycle counter were used, would be due to an almost half cycle asynchronization of the input pulse with each of the leading and trailing edges of the sample pulse. Where the input frequency is low enough that these fractional cycles become of significance to the final result, the fractional cycle counters provide an accurate measurement. The relationship of these factors may also be expressed in terms of the frequency ($f$) being measured, as $$f = \frac{N}{2[T_s + k(C_2 - C_1)]}$$

where N is the number of counts made by the full cycle counter (being twice the number of full cycles counted), $T_s$ equals the duration of the fixed sampling period, $C_1$ and $C_2$ are the number of clock pulse counts made by the fractional cycle counter at the beginning and end of a sample period, and $k$ is a constant for deriving the corresponding time intervals $t_1$ and $t_2$ represented by the clock pulse counts (here $k=10^{-5}$). As frequency increases, N increases, thus providing more samples and decreasing the percentage of error. As frequency decreases, the number of full cycle samples decreases but the $t_2-t_1$ term increases in significance to compensate. The subtraction of $t_1$ from $t_2$ is to be accomplished, as is the remainder of the computation, by the associated data processing equipment.

In consequence, arrangements in accordance with the present invention make full use of the most attractive features of both of the principal prior art techniques. The counts provided are made instantaneously available, wihout a log sampling period or any inordinately short sampling periods. No precise information as to the expected frequency is needed, although it may be desirable to change the sampling period and the fixed frequency source to operate with frequencies of a different order of magnitude. Because of the use of dual channels, the system provides a continuous and uninterrupted series of readings as well as instantaneously available readings for two frequencies. Average frequencies may thus be established with great precision, and the full information content of two variable frequencies may be precisely determined.

A number of alternative units or relationships may be employed, as will be recognized by those skilled in the art. For example, the counters used need not be binary coded decimal, nor need three stages be employed.

Other parallel channel or counter configurations may be employed where more equipment can be tolerated. Furthermore, if many output channels are permissible, all of the recorded counts may be read concurrently.

Although there have been described above and illustrated in the drawings particular arrangements of the invention for continuously and accurately measuring any of a wide range of frequencies, it will be appreciated that the invention is not limited to specific illustrative arrangements. Accordingly, any modifications, variations or equivalent arrangements falling within the scope of the annexed claims should be considered to be a part of the invention.

What is claimed is:

1. Apparatus for determining the frequency of periodic input signals which includes in combination first and second counter circuits, a circuit for operating the first counter circuit with integral parts of the periodic input signals during a fixed sampling period, a source of signals of a known periodicity, and a circuit responsive to the termination of the sampling period and the occurrence of a selected signal characteristic in the input signals for operating the second counter with signals of the known periodicity for a variable sampling period representative of a fractional part of the period of the input signals.

2. A system for accurately determining the frequency of periodic input signals including in combination a circuit operable during a fixed sampling period for counting the periodic signals occurring during that period, a counter circuit, a fixed frequency source, and a circuit coupled to receive the periodic signals and to control the operation of the counter circuit with signals from the fixed frequency source during a variable time period beginning with the end of the sampling period and ending with the occurrence of a selected signal characteristic in the periodic signals.

3. Apparatus for measuring the frequency of cyclic signals including a full cycle counter circuit, a fractional cycle counter circuit, a circuit providing signals establishing a sampling period, a circuit responsive to the cyclic signals for detecting selected cyclic characteristics, a source of signals of a known periodicity, a first control circuit responsive to the signals establishing the sampling period for coupling the full cycle counter circuit to the cyclic signals for the sampling period, and a second control circuit responsive to the signals establishing a sampling period and to the detection of the selected cyclic characteristics for coupling the fractional cycle counter circuit to the signals of a known periodicity for a variable interval.

4. Apparatus for determining the frequency of cyclic signals including means responsive to the cyclic signals for counting integral parts of the cyclic signals for a fixed sampling period, and means responsive to a selected cyclic characteristic in the cyclic signal for measuring the fractional cyclic time interval between the termination of a sampling period and the occurrence of the next selected cyclic characteristic in the cylic signal.

5. Apparatus for continuous and successive sampling at high speed of the frequency of signals of a variable frequency, the apparatus including in combination a source of sampling pulses, a source of signals of a known frequency, a zero crossing detector circuit responsive to the variable frequency signals, a first counter chain of successive stages, a first control circuit responsive to the sampling pulses for coupling the first stage of the first counter chain to the zero crossing detector circuit for a fixed interval, a second counter chain of successive stages, and a second control circuit responsive to the sampling pulses and coupled to the zero crossing detector circuit for coupling the first stage of the second counter chain to the source of signals of a known frequency for a controlled variable interval.

6. Apparatus for continuous and successive measurement at high speed of the frequency of a cyclic input falling within a relatively wide frequency range, the apparatus including in combination a source of sampling pulses, each of which is of a selected duration and immediately follows the preceding sampling pulse, a source of signals of a known fixed frequency higher than that of the range within which the cyclic input is expected to fall, a zero crossing detector responsive to the cyclic input for providing zero crossing pulses, a bistable circuit responsive to the sampling pulses for providing alternate odd and even control pulses corresponding to successive alternate sampling pulses, a first chain of counter stages, the first stage consisting of two counters in parallel, a first control circuit responsive to the sampling pulses and to the odd and even control pulses for providing the zero crossing pulses to the first chain of counter stages for the duration of the sampling pulses, the pulses being applied during successive sampling intervals alternately to the two first stage counters, a second chain of counter stages, and a second control circuit responsive to the sampling pulses and to the zero crossing pulses for applying signals from the known fixed frequency source for an interval controlled by the cyclic relation of the cyclic input to the termination of the sampling pulse period.

7. Apparatus for continuously and accurately determining the frequency of a periodic source of signals, the apparatus including in combination a circuit for detecting the occurrence of a selected signal characteristic in the periodic signals, a relatively high frequency clock pulse source, a source of sampling pulses of a fixed duration, the sampling pulses being provided sequentially, and at least a first and a second counter, the first counter being responsive to the periodic pulses and the sampling pulses to provide a count of the periodic pulses occurring during the fixed period, and the second counter being responsive to the sampling pulses, the detected signal characteristic, and the clock pulses for providing a count of the clock pulses occurring in the interval between the termination of the sampling pulse and the next occurrence of the given signal characteristic, so that the number of pulses counted by the first counter, and the number of clock pulses counted by the second counter, afford an accurate measure of the number of full periodic pulses occurring during the sampling period, together with the phase relationship of those pulses to the sampling period.

8. Apparatus for precise determination of the frequency of a source of periodic pulses of an unknown frequency, the apparatus including in combination a source of sampling pulses of fixed duration, a fixed frequency clock pulse source, a circuit for detecting the occurrence of a given signal characteristic in the periodic pulses, a counter channel including a first counter circuit coupled to the detector and to the source of sampling pulses for counting integral parts of the periodic pulses by counting the occurrence of the detected characteristic during the fixed sampling interval, the counter channel also including a second counter circuit for counting the fractional parts of the periodic pulses by counting the clock pulses from the end of the sampling period to the next detected characteristic, so that the frequency may be precisely determined by knowledge of the number of integral parts occurring during the sampling period, and the number of clock pulses occurring during the fractional intervals following the start and end of the sampling period.

9. Apparatus for making successive determinations of the frequency of a source of periodically recurring signals and including the combination of at least a pair of counter chains, circuits responsive to the periodically recurring signals and coupled to the counter chains for providing groups of signals from the source successively to the different counter chains during successive time intervals, and decoding means coupled to each of the counter chains for reading counts recorded therein in a previous time interval as the next succeeding group of periodically recurring signals are provided to other of the counter chains.

10. Apparatus for making successive determinations of the frequency of a source of periodic signals, the apparatus including in combination first and second counter chains, the first of which includes parallel first stages, a fixed frequency source, means for providing pulses defining fixed sampling periods, means coupled to the counter chains, the fixed frequency source and the means for providing pulses, for operating the first counter chain to count the periodic signals during the fixed sampling periods, with the first stages thereof being operated alternately with successive sampling periods, and for operating the second counter chain to count signals from the fixed frequency source for variable time intervals following the termination of each sampling period, and decoding circuits coupled to each of the counter chains for reading out the counts recorded therein in the intervals between successive operations thereof.

11. Apparatus for counting to determine the frequency of two alternating frequency sources during successive sampling periods, and including in combination a pair of counter channels, each including a full cycle counter and a fractional cycle counter, a pair of zero crossing detectors, each responsive to a different alternating frequency source and coupled to a different one of the counter channels, a fixed frequency pulse source coupled to the fractional counter in each of the channels, gating circuits for applying pulses from the alternating frequency source to the full cycle counter in each of the channels during the period of the sampling pulse, and gating circuits coupled to each of the channels for applying pulses from the fixed frequency source to the fractional cycle counter during the period from the end of the sampling pulse to the next zero crossing signal.

12. A system for successively determining the frequency of two input sources, the system including a source providing successive sampling pulses, a duration of which determines a sampling period, a fixed frequency source of pulses, a pair of zero crossing detector circuits, each responsive to a different input frequency source, a pair of counter channels, the counter channels being substantially alike and each coupled to a different zero crossing detector circuit, each of the counter channels including a full cycle counter for counting the cycles of the input source, the cycle counter including a cascade of individual counters arranged to provide decades of values, the first counter stage including a pair of counters arranged in parallel, each of the counter channels also including a fractional cycle counter having a cascade of individual counters arranged to provide decades of values, for counting pulses from the fixed frequency source for a selected period, the system also including control circuits coupled to each of the counter channels, the sampling pulse source, the fixed frequency source and the zero crossing detectors for operating the full cycle counters in each channel during the sampling period, and also for operating the fractional cycle counters in each channel during the interval between the termination of the sampling period and the next occurring zero crossing signal for that channel, and the system also including a selector circuit responsive to the sampling pulses and coupled to the control circuits in each of the channels for alternating the use of the first stage counters in the channels with successive sampling pulses.

References Cited in the file of this patent

UNITED STATES PATENTS

| | | |
|---|---|---|
| 2,665,410 | Burbeck | Jan. 5, 1954 |
| 2,665,411 | Frady | Jan. 5, 1954 |
| 2,919,402 | Hanlet | Dec. 29, 1959 |
| 2,925,555 | Gordon | Feb. 16, 1960 |
| 2,928,046 | Hansel | Mar. 8, 1960 |